(12) United States Patent
Zhang et al.

(10) Patent No.: US 11,013,258 B2
(45) Date of Patent: May 25, 2021

(54) TUBE-SHAPED POWER SUPPLY DEVICE FOR SUPPLYING POWER TO ATOMIZER

(71) Applicant: SHENZHEN UWELL TECHNOLOGY CO., LTD., Shenzhen (CN)

(72) Inventors: Jingren Zhang, Shenzhen (CN); Yucheng Xiao, Shenzhen (CN)

(73) Assignee: SHENZHEN UWELL TECHNOLOGY CO., LTD., Shenzhen (CN)

(*) Notice: Subject to any disclaimer, the term of this patent is extended or adjusted under 35 U.S.C. 154(b) by 364 days.

(21) Appl. No.: 16/191,472

(22) Filed: Nov. 15, 2018

(65) Prior Publication Data
US 2019/0191766 A1 Jun. 27, 2019

(30) Foreign Application Priority Data
Dec. 26, 2017 (CN) .......................... 201721847918.5

(51) Int. Cl.
| A24F 13/00 | (2006.01) |
| A24F 7/00 | (2006.01) |
| H02J 7/00 | (2006.01) |
| A24F 40/40 | (2020.01) |
| A24F 40/50 | (2020.01) |
| A24F 40/60 | (2020.01) |
| A24F 40/90 | (2020.01) |
| A24F 40/10 | (2020.01) |

(52) U.S. Cl.
CPC ................ *A24F 7/00* (2013.01); *A24F 40/40* (2020.01); *A24F 40/50* (2020.01); *A24F 40/60* (2020.01); *A24F 40/90* (2020.01); *H02J 7/00* (2013.01); *A24F 40/10* (2020.01)

(58) Field of Classification Search
CPC ...................................................... A24F 47/00
USPC .................................................. 131/328–329
See application file for complete search history.

(56) References Cited

U.S. PATENT DOCUMENTS

2019/0090542 A1* 3/2019 Harrison ................. A24F 40/46

* cited by examiner

*Primary Examiner* — Phuong K Dinh

(57) ABSTRACT

A tube-shaped power supply device for an atomizer includes a hollow main housing with two open portions engaging with a main connecting member and a base, an electrical core received in the main housing, a PCB integral with a circuit for charging the electrical core and adjusting its output power, a frame received in the main housing and supporting the electrical core and the PCB. A receiving room is formed between the frame and an inner wall of the main housing for receiving the electrical core therein. The PCB is arranged on a side of the frame back to the electrical core. First positive and negative electrodes of the PCB are electrically connected to second positive and negative electrodes of the electrical core, respectively. A power output in the main connecting member is electrically connected to a main output of an adjustment output power of the PCB.

20 Claims, 6 Drawing Sheets

US 11,013,258 B2

TUBE-SHAPED POWER SUPPLY DEVICE FOR SUPPLYING POWER TO ATOMIZER

BACKGROUND

1. Technical Field

The present disclosure generally relates to electronic cigarettes field, and especially relates to a tube-shaped power supply device for supplying power to an atomizer used in an electronic cigarette.

2. Description of Related Art

At present, there are two main types of tube-shaped power supply devices which are configured for supplying power to an atomizer: one type is a pressure adjusting tube-shaped power supply device with a non-replaceable electrical core therein which has disadvantages such as poor running ability, low power and a small range of suitable atomizers. The other type is a mechanical tube-shaped power supply device with a replaceable electrical core therein, but there is no corresponding circuits such as PCBs within the tube-shaped power supply device. Such tube-shaped power supply device has disadvantages that it is impossible to charge the electric core via a USB, or to adjust its power and without protection circuits, thereby the safety performance of the atomizer is poor.

SUMMARY

The technical problems to be solved: in view of the shortcomings of the related art, the present disclosure relates to a tube-shaped power supply device for supplying power to an atomizer which can not only conveniently replace and recharge the electrical core, but also have a more compact structure and a higher space utilization.

The technical solution adopted for solving technical problems of the present disclosure is:

a tube-shaped power supply device for supplying power to an atomizer includes a hollow main housing with a first open portion and a second open portion opposite to the first open portion; a main connecting member installed on the first open portion of the main housing; a base installed on the second open portion of the main housing; an electrical core received in the main housing; a PCB integrated with a circuit for charging the electrical core and adjusting its output power; a frame received in the main housing and supporting the electrical core and the PCB; a power output port received in the main connecting member and electrically connected to a main output of an adjustment output power of the PCB; and a receiving room formed between the frame and an inner wall of the main housing for receiving the electrical core therein. The PCB is arranged on a side of the frame facing away from the electrical core; a first positive electrode of the PCB is electrically connected to a second positive electrode of the electrical core, while a first negative electrode of the PCB is electrically connected to a second negative electrode of the electrical core.

Wherein the PCB includes a charging module configured to charge the electrical core, with a first output thereof connecting to the electrical core; a microprogrammed control unit (MCU), a sampling module configured to sample a voltage signal, a current signal and a status signal of the atomizer output from the power output port and feedback collection information to the microprogrammed control unit, with a sampling output of the sampling module connecting to a sampling input of the microprogrammed control unit; a booster and step-down module configured to adjust the voltage of the power output port, with a controlling, portion thereof connecting to a controlling output of the microprogrammed control unit; and a human-machine interface (HMI) arranged on the main housing and configured to input adjustment instructions from user and then send a corresponding instruction to the microprogrammed control unit, with a second output of the human-machine interface connecting to the microprogrammed control unit.

Wherein the tube-shaped power supply device further includes a power key, an increase key and a decrease key each connected to a corresponding micro-switch and electrically connected to the sampling module.

Wherein the frame includes an arc-shaped side plate and a cover perpendicularly integral with the side plate.

Wherein the receiving room formed between the side plate of the frame and the main housing is circular in cross-section and eccentrically arranged relative to the main housing.

Wherein the PCB includes a first PCB sub-board arranged on a first surface of the side plate facing away from the electrical core, and a second PCB sub-board arranged on a second surface of the cover facing away from the electrical core and tightly fixed to the first PCB sub-board to form an L-shaped configuration therebetween.

Wherein a USB charging port is arranged on the main housing and electrically connected to a charging circuit input of the PCB.

Wherein the power output port of the main connecting member is a 510 interface commonly used in the industry.

Wherein the base includes a body connected to the main housing via screw-threads and including a metal connecting block, with a hollow cylindrical configuration and a male thread on its outer edge to engage with a female thread of the main housing, and a bottom plate connected to the metal connecting block by a press fit manner; a spring received in a hollow portion of the metal connecting block of the body and including a first end resisting against the bottom plate of the body and an opposite second end resisting against a metal slider of the body; and wherein the metal slider, with a convex-shaped configuration, is received in the body to connect to the metal connecting block by wires and resist against the second end of the spring, and includes two opposite third ends respectively connected to the metal connecting block in a displacement form.

Wherein the tube-shaped power supply device further includes a displaying interface arranged on the main housing and configured to display working status of the tube-shaped power supply device, and a screen cover covered on the displaying interface for protecting the displaying interface; a displaying input of the displaying interface connected to a displaying output of the microprogrammed control unit.

Wherein the base includes a body connected to the main housing via screw-threads and including a metal connecting block, with a hollow cylindrical configuration and a male thread on its outer edge to engage with a female thread of the main housing, and a bottom plate connected to the metal connecting block by a press fit manner; a spring received in a hollow portion of the metal connecting block of the body and including a first end resisting against the bottom plate of the body and an opposite second end resisting against a metal slider of the body; and wherein the metal slider, with a convex-shaped configuration, is received in the body to connect to the metal connecting block by wires and resist against the second end of the spring, and includes two opposite third ends respectively connected to the metal connecting block in a displacement form.

Wherein a USB charging port is arranged on the main housing and electrically connected to a charging circuit input of the PCB.

Wherein the tube-shaped power supply device further includes a displaying interface arranged on the main housing and configured to display working status of the tube-shaped power supply device, and a screen cover covered on the displaying interface for protecting the displaying interface; a displaying input of the displaying interface connected to a displaying output of the microprogrammed control unit.

Wherein the base includes a body connected to the main housing via screw-threads and including a metal connecting block, with a hollow cylindrical configuration and a male thread on its outer edge to engage with a female thread of the main housing, and a bottom plate connected to the metal connecting block by a press fit manner; a spring received in a hollow portion of the metal connecting block of the body and including a first end resisting against the bottom plate of the body and an opposite second end resisting against a metal slider of the body; and wherein the metal slider, with a convex-shaped configuration, is received in the body to connect to the metal connecting block by wires and resist against the second end of the spring, and includes two opposite third ends respectively connected to the metal connecting block in a displacement form.

Wherein a USB charging port is arranged on the main housing and electrically connected to a charging circuit input of the PCB.

Wherein the base includes a body connected to the main housing via screw-threads and including a metal connecting block, with a hollow cylindrical configuration and a male thread on its outer edge to engage with a female thread of the main housing, and a bottom plate connected to the metal connecting block by a press fit manner; a spring received in a hollow portion of the metal connecting block of the body and including a first end resisting against the bottom plate of the body and an opposite second end resisting against a metal slider of the body; and wherein the metal slider, with a convex-shaped configuration, is received in the body to connect to the metal connecting block by wires and resist against the second end of the spring, and includes two opposite third ends respectively connected to the metal connecting block in a displacement form.

An electronic cigarette according to an exemplary embodiment of the present disclosure includes a mouthpiece, an atomizer connected to the bottom of the mouthpiece, an adjusting valve connected to the bottom of the atomizer and a tube-shaped power supply device supplying power to the atomizer and connected to the bottom of the adjusting valve. The tube-shaped power supply device includes a hollow main housing with a first open portion and a second open portion opposite to the first open portion; a main connecting member installed on the first open portion of the main housing; a base installed on the second open portion of the main housing; an electrical core received in the main housing; a PCB integrated with a circuit for charging the electrical core and adjusting its output power; a frame received in the main housing and supporting the electrical core and the PCB; a power output port received in the main connecting member and electrically connected to a main output of an adjustment output power of the PCB; and a receiving room formed between the frame and an inner wall of the main housing for receiving the electrical core therein. The PCB is arranged on a side of the frame facing away from the electrical core; a first positive electrode of the PCB is electrically connected to a second positive electrode of the electrical core, while a first negative electrode of the PCB is electrically connected to a second negative electrode of the electrical core.

Wherein the PCB includes a charging module configured to charge the electrical core, with a first output thereof connecting to the electrical core; a microprogrammed control unit (MCU), a sampling module configured to sample a voltage signal, a current signal and a status signal of the atomizer output from the power output port and feedback the collection information to the microprogrammed control unit, with a sampling output of the sampling module connecting to a sampling input of the microprogrammed control unit; a booster and step-down module configured to adjust the voltage of the power output port, with a controlling portion thereof connecting to a controlling output of the microprogrammed control unit; and a human-machine interface (HMI) arranged on the main housing and configured to input adjustment instructions from user and then send a corresponding instruction to the microprogrammed control unit, with a second output of the human-machine interface connecting to the microprogrammed control unit.

Wherein the base includes a body connected to the main housing via screw-threads and including a metal connecting block, with a hollow cylindrical configuration and a male thread on its outer edge to engage with a female thread of the main housing, and a bottom plate connected to the metal connecting block by a press fit manner; a spring received in a hollow portion of the metal connecting block of the body and including a first end resisting against the bottom plate of the body and an opposite second end resisting against a metal slider of the body; and wherein the metal slider, with a convex-shaped configuration, is received in the body to connect to the metal connecting block by wires and resist against the second end of the spring, and includes two opposite third ends respectively connected to the metal connecting block in a displacement form.

Wherein the tube-shaped power supply device further includes a displaying interface arranged on the main housing and configured to display working status of the tube-shaped power supply device, and a screen cover covered on the displaying interface for protecting the displaying interface; a displaying input of the displaying interface connected to a displaying output of the microprogrammed control unit.

The present disclosure provides the advantages as below.

The structure of the present disclosure can easily change the electrical core from the main housing via disassembling the base when needing to replace the electrical core, and obtain a more compact structure and higher space utilization via installing a frame in the main housing for supporting the PCB and the electrical core. In addition, the PCB of the present disclosure is integrated with a circuit for charging the electrical core and adjusting the output power of the power output port according to the actual situation, thereby the product experience can be improved.

BRIEF DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

Figure 1:
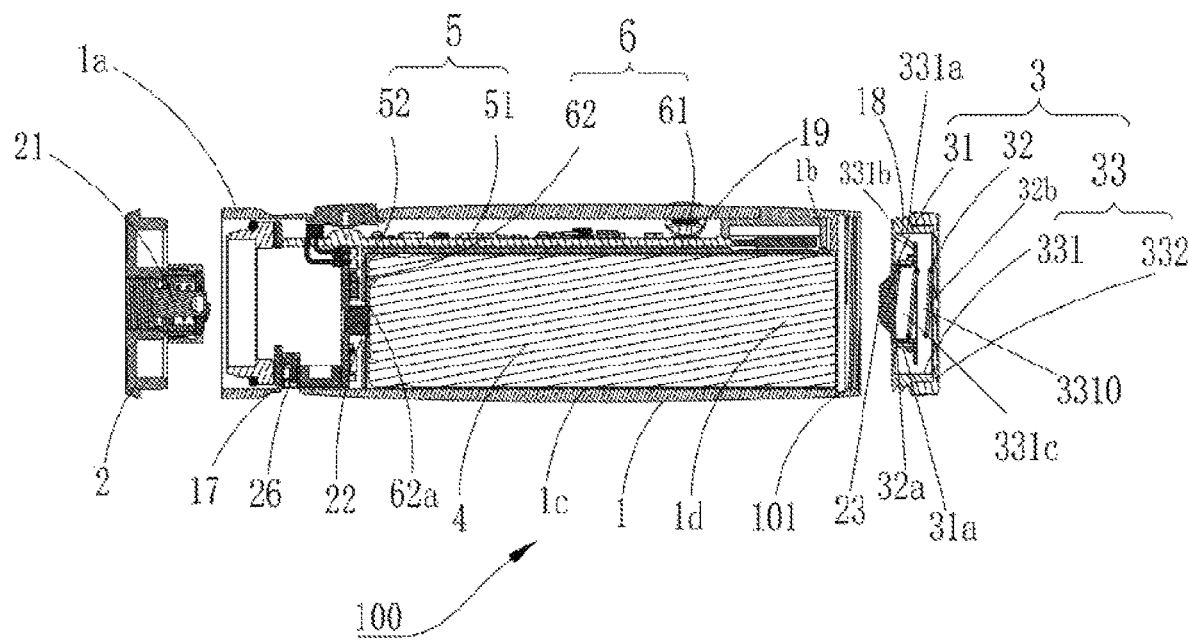
FIG. 1 is a cross-sectional view of the tube-shaped power supply device for supplying power to an atomizer in accordance with an exemplary embodiment.

The element labels according to the exemplary embodiment of the present disclosure shown as below:
tube-shaped power supply device for supplying power to an atomizer 100, main housing 1, first open portion 1a, second open portion 1b, inner wall 1c, receiving room 1d, female thread 101, main connecting member 2, power output port 21, base 3, metal slider 31, third end 31a, spring 32, first end 32a, second end 32b, body 33, metal connecting, block 331, outer edge 331a, male thread 331b, circular hollow member 331c, hollow portion 3310, bottom plate 332, electrical core 4, PCB 5, first PCB sub-board 51, second PCB sub-board 52, frame 6, side plate 61, first surface 61a, cover 62, second surface 62a, charging module 7, first output 7a, microprogrammed control unit (MCU) 8, sampling input 8a, controlling output 8b, displaying output 8c, sampling module 9, sampling output 9a, booster and step-down module 10, controlling portion 10a, human-machine interface (HMI) 11, second output 11a, displaying module 12, displaying input 12a, power key 13, increase key 14, decrease key 15, screen cover 16, USB charging port 17, wire 18, micro-switch 19, first positive electrode 22, first negative electrode 23, second positive electrode 24, second negative electrode 25, charging circuit input 26, main output 27, atomizer 28, displaying module 102, mouthpiece 201, adjusting valve 202.

DETAILED DESCRIPTION

The disclosure is illustrated by way of example and not by way of limitation in the figures of the accompanying drawings, in which like reference numerals indicate similar elements.

Figure 2:
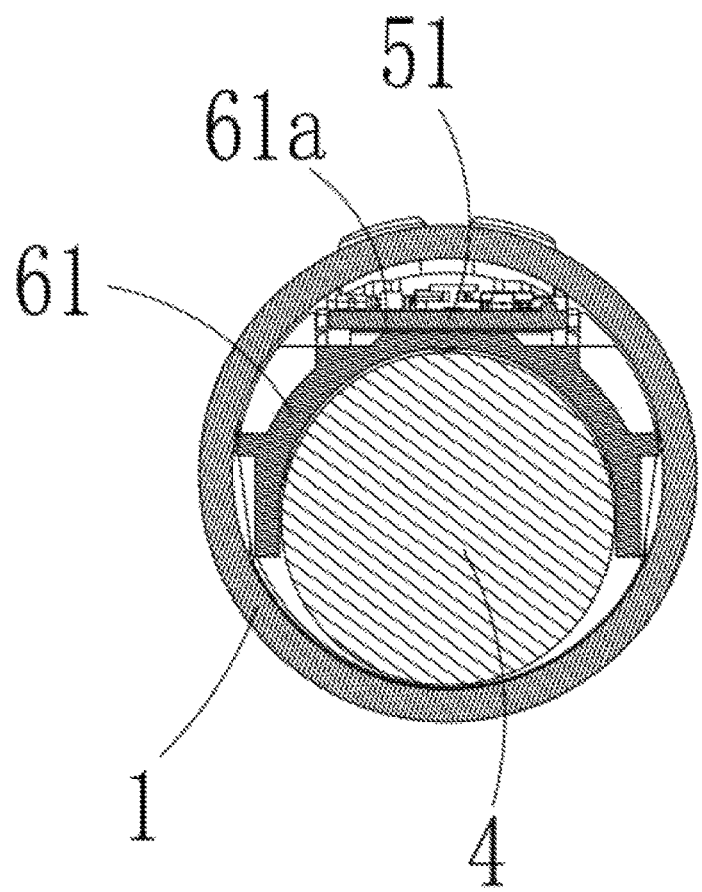
FIG. 2 is similar to FIG. 1, but shown from the other view.
Figure 3:
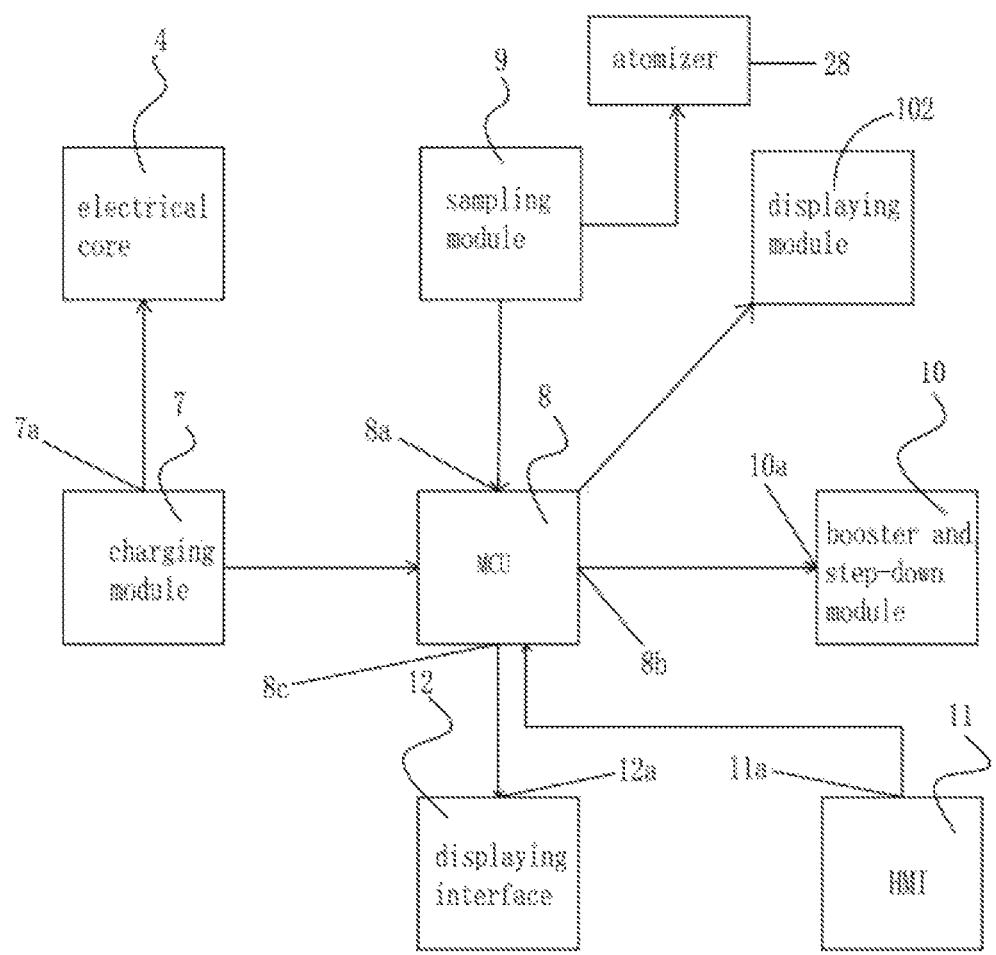
FIG. 3 is a circuit chart view of a PCB of the tube-shaped power supply device for supplying power to an atomizer of FIG. 1.
Figure 4:
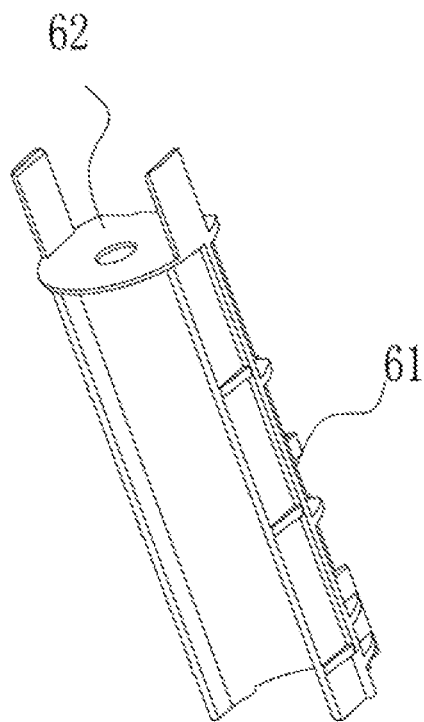
FIG. 4 is a schematic view of a frame of the tube-shaped power supply device for supplying power to an atomizer of FIG. 1.
Figure 5:
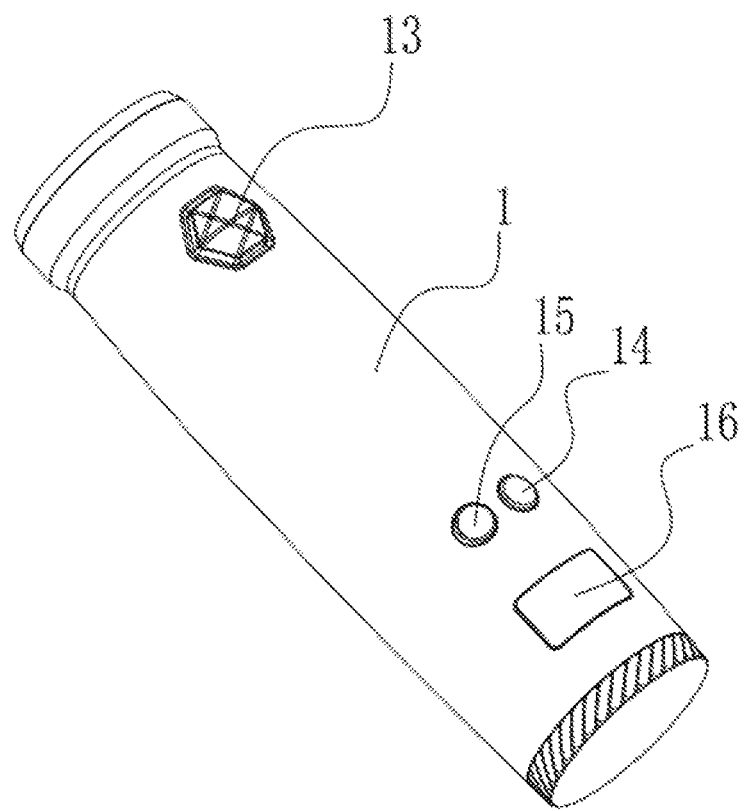
FIG. 5 is a schematic view of the tube-shaped power supply device for supplying power to an atomizer of FIG. 1.
Figure 6:
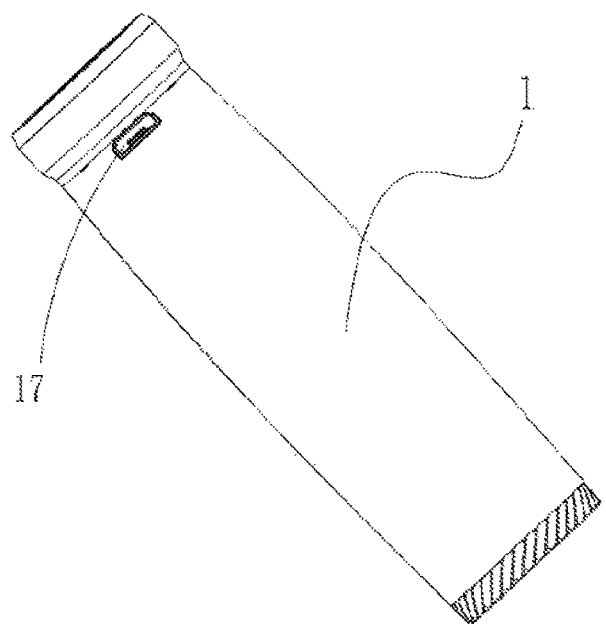
FIG. 6 is similar to FIG. 5, but shown from another view.
Figure 7:
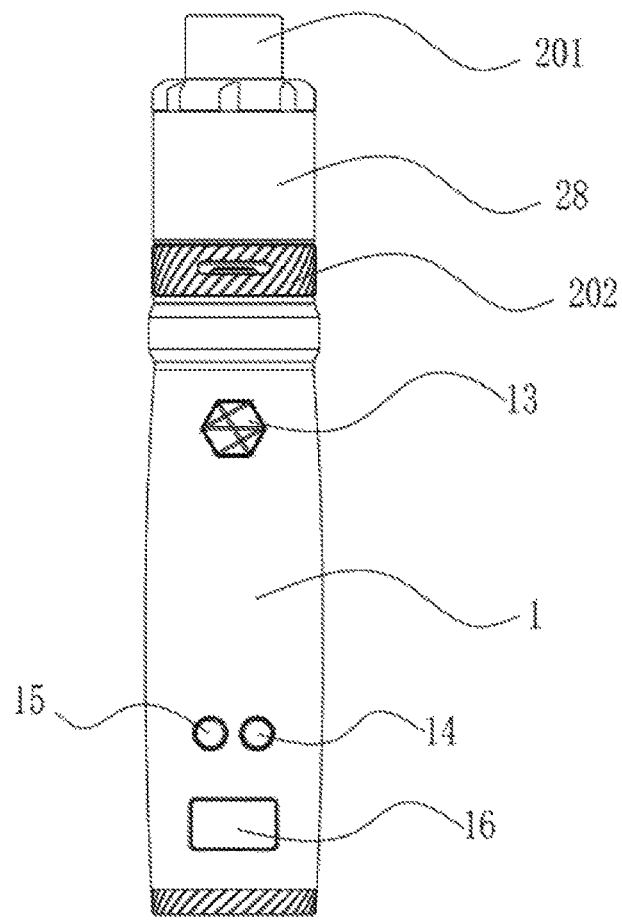
FIG. 7 is an assembly schematic view of a mouthpiece, an atomizer, an adjusting valve and the tube-shaped power supply device for supplying power to an atomizer of FIG. 1.
Figure 8:
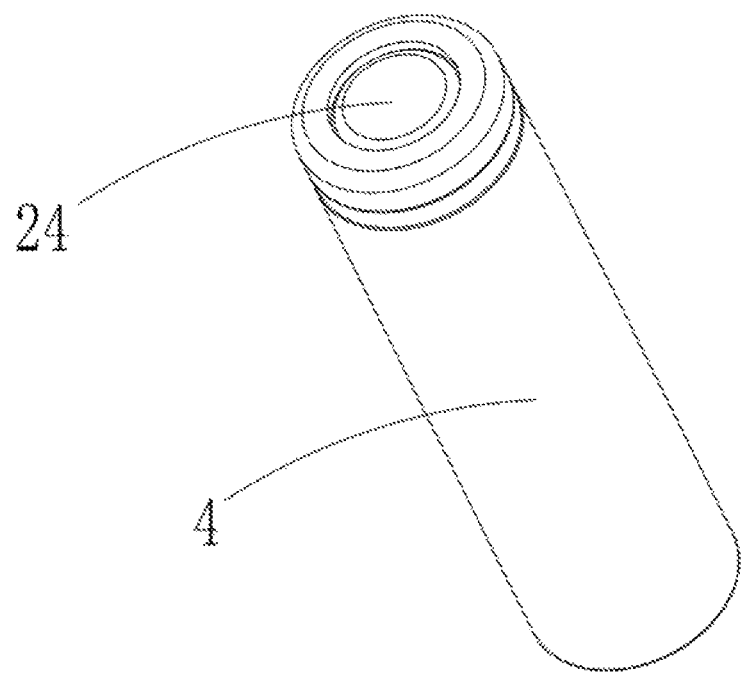
FIG. 8 is a schematic view of an electrical core of the tube-shaped power supply device for supplying power to an atomizer of FIG. 1.
Figure 9:
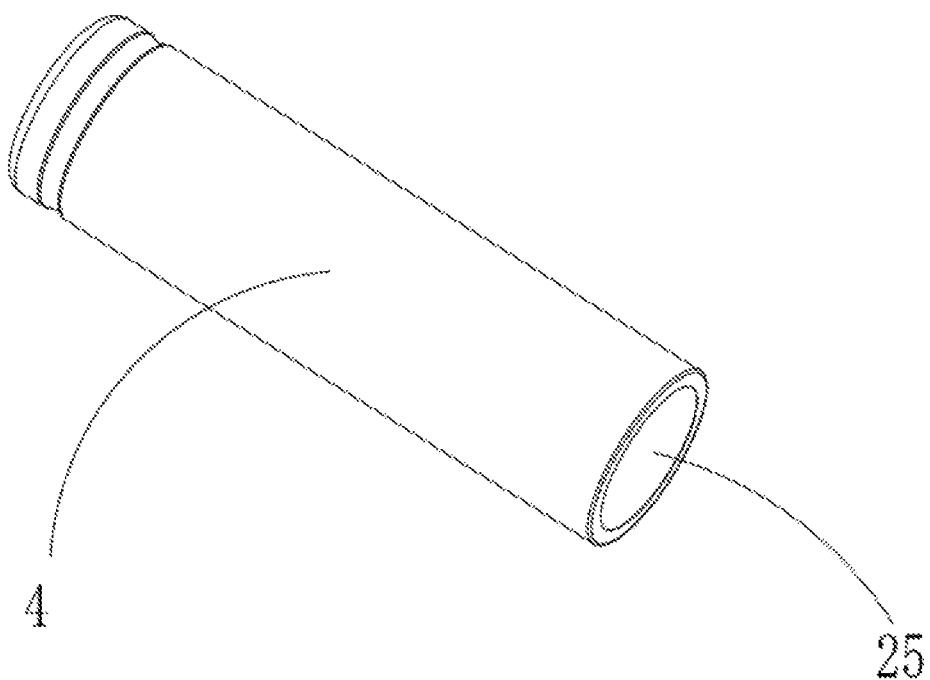
FIG. 9 is similar to FIG. 8, but shown from the other view.
Figure 10:
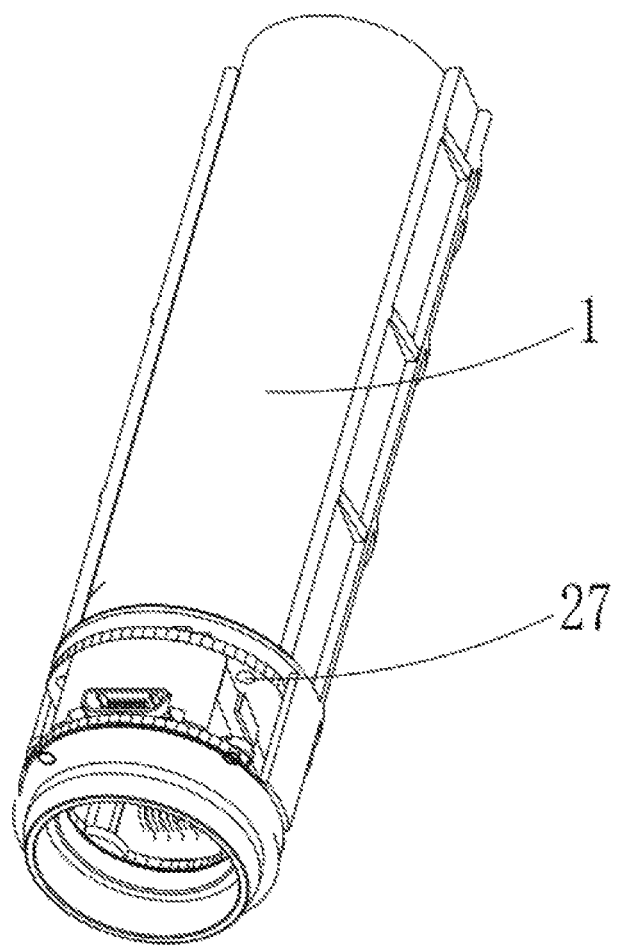
FIG. 10 is a partial schematic view of the tube-shaped power supply device for supplying power to an atomizer of FIG. 1, focused on showing a main output of the PCB.

Referring to FIGS. 1-10, a tube-shaped power supply device 100 for supplying power to an atomizer 28 is installed in an electronic cigarette. The electronic cigarette includes a mouthpiece 201, the atomizer 28 connected to the bottom of the mouthpiece 201, an adjusting valve 202 connected to the bottom of the atomizer 28, and the tube-shaped power supply device 100 connected to the bottom of the atomizer 28. The tube-shaped power supply device 100 includes a hollow main housing 1 with a first open portion 1a and a second opposite open portion 1b thereof; a main connecting member 2 installed on the first open portion 1a of the main housing 1; a base 3 installed on the second open portion 1b of the main housing 1; an electrical core 4 received in the main housing 4; a PCB 5 integrated with a circuit for charging the electrical core 4 and adjusting its output power; and a frame 6 received in the main housing 1 and supporting the electrical core 4 and the PCB 5. A power output port 21 is received in the main connecting member 2 and electrically connected to a main output 27 of an adjustment output power of the PCB 5, and a receiving room 1d is formed between the frame 6 and an inner wall 1c of the main housing 1 for receiving the electrical core 4 therein. The PCB 5 is arranged on a side of the frame 6 facing away from the electrical core 4. A first positive electrode 22 of the PCB 5 is electrically connected to a second positive electrode 24 of the electrical core 4, while a first negative electrode 23 of the PCB 5 is electrically connected to a second negative electrode 25 of the electrical core 4.

Specifically, the frame 6 includes an arc-shaped side plate 61 and a cover 62 perpendicular to the side plate 61. It should be noted that the side plate 61 can be integral with the cover 62 to form a part therebetween for enhancing the stability of the frame 6. In addition, the side plate 61 and the cover 62 can be made separately to form two different parts, which can be selected according to the actual situation.

In an exemplary embodiment of the present disclosure, the electrical core 4 is received in the receiving room 1d. In this way, the electrical core 4 can be easily removed from the main housing 1 via disassembling the base 3 when needing to replace the electrical core 4, and obtain a more compact structure and higher space utilization via installing the frame 6 in the main housing 1 for supporting the PCB 5 and the electrical core 4. In addition, the PCB 5 of the present disclosure is integrated with a circuit for charging the electrical core 4 and adjusting the output power of the power output port 21 according to the actual situation, thereby the product experience can be improved.

In an exemplary embodiment of the present disclosure, in order to further save space, a cross-sectional of the receiving room 1d formed between the side plate 61 of the frame 6 and the main housing 1 is circular. The receiving room 1d is eccentrically arranged relative to the main housing 1.

In an exemplary embodiment of the present disclosure, in order to further improve the compactness of the overall structure of the tube-shaped power supply device 10, the PCB 5 includes a first PCB sub-board 51 arranged on a first surface 61a of the side plate 61 facing away from the electrical core 4, and a second PCB sub-board 52 arranged on a second surface 62a of the cover 62 facing away from the electrical core 4. The first PCB sub-board 51 and the second PCB sub-board 52 are tightly fixed to each other to form an L-shaped configuration therebetween. Such configuration above is provided so that the overall structure of the tube-shaped power supply device 100 is more compact and the space utilization is higher.

Specifically, in an exemplary embodiment of the present disclosure, a USB charging port 17 is arranged on the main housing 1 and electrically connected to a charging circuit input 26 of the PCB 5.

Specifically, the power output port 21 of the main connecting member 2 is a 510 interface commonly used in the industry.

Specifically, the base 3 includes a metal slider 31, a spring 32 and a body 33 connected to the main housing 1 via screw-threads. The metal slider 31 and the spring 32 are installed on the body 33, and a first end 32a of the spring 32 is resisted against the body 33 and a second end 32b is resisted against the metal slider 31. The body 33 is electrically connected to the main housing 1 via screw-threads. The metal slider 31 presses the second negative electrode 25 of the electrical core 4 under the action of the spring 32 so that the body 33 is electrically connected to the second negative electrode 25 of the electrical core 4. At the same time, the main housing 1 is electrically connected to the first negative electrode 23 of the PCB 5. In this way, the electrical connection between the first negative electrode 23 of the PCB 5 and the second negative electrode 25 of the electrical core 4 can be obtained. In other exemplary embodiments of the present disclosure, the metal slider 31 can be electrically connected to the body 33 via wires 18.

Specifically, the base 3 includes a metal connecting block 331 and a bottom plate 332 connected to the metal connecting block 331 via a press fit manner. The metal connecting block 331 is a hollow cylindrical configuration and includes a male thread 331*b* formed on its outer edge 331*a* to engage with a female thread 101 of the main housing 1.

The metal slider 31 is a convex-shaped configuration and includes two opposite third ends 31*a* respectively connected to the metal connecting block 331 in a displacement form. The spring 32 is received in a hollow portion 3310 of the metal connecting block 331. The first end 32*a* of the spring 32 is resisted against the bottom plate 332, while the second end 32*b* of the spring 32 is resisted against the metal slider 31. The metal slider 31 is connected to the metal connecting block 331 via wires 18 to avoid generating contact resistance therebetween. At this time, the metal slider 31 passes through a circular hollow member 331*c* of the metal connecting block 331, and then is connected to the body 33 by a press fit manner. In this way, it can ensure that the metal slider 31 elastically moves up and down along an axial direction of the base 3 under the extrusion action of the spring 32. In other exemplary embodiments of the present disclosure, the metal slider 31 can be electrically connected to the body 33 via wires 18.

Specifically, the PCB 5 includes a charging module 7 configured to charge the electrical core 4, a microprogrammed control unit (MCU) 8, a sampling module 9 configured to sample a voltage signal, a current signal and a status signal of the atomizer 28 output from the power output port 21 and feedback collection information to the microprogrammed control unit 8, a booster and step-down module 10 configured to adjust the voltage of the power output port 21, and a human-machine interface (HMI) 11 arranged on the main housing 1 and configured to input adjustment instructions from user and then send a corresponding instruction to the microprogrammed control unit 8. A first output 7*a* of the charging module 7 is connected to the electrical core 4. A sampling output 9*a* of the sampling module 9 is connected to a sampling input 8*a* of the microprogrammed control unit 8, and a controlling output 8*b* of the microprogrammed control unit 8 is connected to a controlling portion 10*a* of the booster and step-down module 10. A second output 11*a* of the human-machine interface 11 is connected to the microprogrammed control unit 8. When a power supply detected by the microprogrammed control unit 8 is accessed, the microprogrammed control unit 8 will send an instruction to the charging module 7 to start charging the electrical core 4. After the electrical, core 4 is fully charged, the charging module 7 sends a feedback signal to the microprogrammed control unit 8 and then the microprogrammed control unit 8 sends a corresponding instruction to a displaying module 102 for displaying charging information. The human-machine interface 11 is configured to input parameter settings from user and then feedback a corresponding parameter value to the microprogrammed control unit 8, which can be further controlled by the microprogrammed control unit 8. The adjustment process of the output power is shown below: after user sets the output power through the human-machine interface (HMI) 11 or other ways, the microprogrammed control unit 8 can read the resistance value of the atomizer 28 through the sampling module 9 and then send corresponding information to the booster and step-down module 10 according to the resistance value of the atomizer 28 and the power information processed by a software. Then, the booster and step-down module 10 converts the voltage of a battery into a voltage value and a current value required by the electronic cigarette and then sends them to the atomizer 28, and simultaneously feedbacks the output voltage and current to the microprogrammed control unit 8 via the sampling module 9 to confirm whether it is consistent with its setting power.

Furthermore, the tube-shaped power supply device 100 further includes a displaying interface 12 arranged on the main housing 1 and configured to display working status of the tube-shaped power supply device 100, and a screen cover 16 covered on the displaying interface 12 for protecting the displaying interface 12. A displaying input 12*a* of the displaying interface 12 is connected to a displaying output 8*c* of the microprogrammed control unit 8.

Furthermore, the tube-shaped power supply device 100 further includes a power key 13, an increase key 14 and a decrease key 15. Each of the power key 13, the increase key 14 and the decrease key 15 is connected to a corresponding micro-switch 19 and electrically connected to the sampling module 9. The tube-shaped power supply device 100 includes a plurality of output modes such as a power output mode, a voltage regulation output mode, a temperature control output mode, and a Bypass output mode (Bypass). The switching of the output modes and the adjustment of the value can be achieved by means of cooperatively using the power key 13, the increase key 14 and the decrease key 15.

In addition, the PCB 5 further includes an abnormality handling module configured to handle abnormality of the product and have a plurality of abnormality handling modes such as low-voltage protection, short-circuit protection, low-resistance protection, no-load protection, overheat protection, time-out protection, over-current protection and temperature control dry-burning protection. The low-voltage protection is referred that a standby state of a RUN key is not pressed (that is, the battery is not overloaded), when the voltage of the battery is lower than 3.3V, Low Battery is displayed, while, the output is switched off if the RUN key is turned on. It can be noted that the battery voltage detected by the microprogrammed control unit 8 is a value tested when the battery is not overloaded, but, the battery voltage is not detected when it is output. Power up or turn on, if the battery voltage detected is lower than 3.3V, the tube-shaped power supply device 100 can be automatically shut down after a low-voltage warning is prompted. During output, the low-voltage protection is indicated when the battery voltage is detected below 2.8V. The short-circuit protection is divided to a connection short-circuit and an output short-circuit. The connection short-circuit means that the atomizer 28 itself is a short-circuit atomizer. At this time, turning on the cigarette lighting button, a short-circuit warning is directly prompted when a connection resistance is less than or equal to 0.1Ω. Such output short-circuit means that an unexpected short-circuit of the atomizer 28 occurs in the output process, which is directly displayed: Atom. Shorted. The short-circuit protection mainly refers to the output short-circuit, for safety reasons, the software uses two-level short-circuit protection ways to measure. Firstly, the resistance value of the heating wire is calculated via connecting to the atomizer 28 and inputting a lower voltage, and then the resistance value of the heating wire is determined whether it is less than 0.1Ω. If the resistance value of the heating wire is less than 0.1Ω, it is considered as short-circuit so that a short-circuit warning "Atom. Shorted" is displayed every two seconds. Secondly, during the output process, real-time monitoring of the output current via ADC interruption, the output is immediately turned off when the output current is larger than 40 A set by the program. The no-load protection is divided into no-load without connecting the atomizer and no-load of burnout the heating wire during the output process. When the atomizer 28 is not in connection, the cigarette lighting key is turned on to pop up no-load prompt and then the output is turned off. While, when the cigarette lighting key is released, it returns to a main interface. During the output process, if the heating wire of the atomizer is broken, it is considered as no-load to turn off the output so that the no-load warning "Check. Atom" is displayed. The overheat protection is determined via a NTC thermistor set on the PCB 5. At present, an upper temperature limit of the overheat protection is set to 80° C. When the current temperature of the heating wire is greater than 80° C., it is considered as overheat. When the duration of the high temperature greater than 80° C. is greater than ten seconds or the temperature is lower than 70° C., it is to release the overheat protection. Whenever overheat protection is occurred, it needs to display the duration of the overheat protection for ten seconds, and after the end of ten seconds, it should fall back to the main interface. If the overheat protection is still occurred at this time, the cigarette lighting key is turned on again to display the duration of the overheat protection for another ten seconds, and then further display the overheat warning "Over Temp". The duration of the time-out protection is a continuous output of more than 10 seconds, which is reported to be overtime protected. Such method above is to safety to prevent that the duration of high power output is too long so that the components is abnormal and the loss of the related power elements is increased, thereby affecting the span-life of the product. At the same time, it is also displayed "Over Time". The over-current protection refers that when short-circuit of the heating wire is occurred during smoking and the current is greater than 40 A, the output is automatically turned off. The upper limit of the current is set to 30 A in the actual program, and an error "Over Current" is simultaneously displayed. The temperature control dry-burning protection: the temperature control is actually to prevent dry burning, as long as the temperature does not exceed a preset temperature, it isn't happened cotton burning. In the present disclosure, the upper temperature limit of the oil conducting cotton is 300° C. In general, there are two ways to determine whether it is dry-burning: one way is that a dry cotton is plugged into the coil of the heating wire and then the cigarette lighting key is turned on, the cotton isn't burned black. The other way is that the dry cotton in the coil of the heating wire is filled with oil and then the cigarette lighting key is turned on, the cotton isn't burned mush until the electronic liquid is almost used. Such method is to protect the atomizer from burning out.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A tube-shaped power supply device for supplying power to an atomizer comprising:

a hollow main housing with a first open portion and a second open portion opposite to the first open portion;
    a main connecting member installed on the first open portion of the main housing;
    a base installed on the second open portion of the main housing;
    an electrical core received in the main housing;
    a PCB integrated with a circuit for charging the electrical core and adjusting its output power;
    a frame received in the main housing and supporting the electrical core and the PCB;
    a power output port received in the main connecting member and electrically connected, to a main output of an adjustment output power of the PCB;
    a receiving room formed between the frame and an inner wall of the main housing for receiving the electrical core therein; and wherein the PCB is arranged on a side of the frame facing away from the electrical core;
    a first positive electrode of the PCB is electrically connected to a second positive electrode of the electrical core, while a first negative electrode of the PCB is electrically connected to a second negative electrode of the electrical core.

2. The tube-shaped power supply device for supplying power to an atomizer as claimed in claim 1, wherein the PCB comprises:

a charging module configured to charge the electrical core, with a first output thereof connecting to the electrical core;
    a microprogrammed control unit (MCU);
    a sampling module configured to sample a voltage signal, a current signal and a status signal of the atomizer output from the power output port and feedback collection information to the microprogrammed control unit, with a sampling output of the sampling module connecting to a sampling input of the microprogrammed control unit;
    a booster and step-down module configured to adjust the voltage of the power output port, with a controlling portion thereof connecting to a controlling output of the microprogrammed control unit; and
    a human-machine interface (HMI) arranged on, the main housing and configured to input adjustment instructions from user and then send a corresponding instruction to the microprogrammed control unit, with a second output of the human-machine interface connecting to the microprogrammed control unit.

3. The tube-shaped power supply device for supplying power to an atomizer as claimed in claim 2, wherein the tube-shaped power supply device further comprises a power key, an increase key and a decrease key each connected to a corresponding micro-switch and electrically connected to the sampling module.

4. The tube-shaped power supply device for supplying power to an atomizer as claimed in claim 1, wherein the frame comprises an arc-shaped side plate and a cover perpendicularly integral with the side plate.

5. The tube-shaped power supply device for supplying power to an atomizer as claimed in claim 4, wherein the receiving room formed between the side plate of the frame and the main housing is circular in cross-section and eccentrically arranged relative to the main housing.

6. The tube-shaped power supply device for supplying power to an atomizer as claimed in claim 4, wherein the PCB comprises a first PCB sub-board arranged on a first surface of the side plate facing away from the electrical core, and a second PCB sub-board arranged on a second surface of the cover facing away from the electrical core and tightly fixed to the first PCB sub-board to form an L-shaped configuration therebetween.

7. The tube-shaped power supply device for supplying power to an atomizer as claimed in claim 1, wherein a USB charging port is arranged on the main housing and electrically connected to a charging circuit input of the PCB.

8. The tube-shaped power supply device for supplying power to an atomizer as claimed in claim 7, wherein the power output port of the main connecting member is a 510 interface commonly used in the industry.

9. The tube-shaped power supply device for supplying power to an atomizer as claimed in claim 1, wherein the base comprises:
   a body connected to the main housing via screw-threads and comprising a metal connecting block, with a hollow cylindrical configuration and a male thread on its outer edge to engage with a female thread of the main housing, and a bottom plate connected to the metal connecting block by a press fit manner;
   a spring received in a hollow portion of the metal connecting block of the body and comprising a first end resisting against the bottom plate of the body and an opposite second end resisting against a metal slider of the body; and wherein the metal slider, with a convex-shaped configuration, is received in the body to connect to the metal connecting block by wires and resist against the second end of the spring, and comprises two opposite third ends respectively connected to the metal connecting block in a displacement for n.

10. The tube-shaped power supply device for supplying power to an atomizer as claimed in claim 2, wherein the tube-shaped power supply device further comprises a displaying interface arranged on the main housing and configured to display working status of the tube-shaped power supply device, and a screen cover covered on the displaying interface for protecting the displaying interface; a displaying input of the displaying interface connected to a displaying output of the microprogrammed control unit.

11. The tube-shaped power supply device for supplying power to an atomizer as claimed in claim 2, wherein the base comprises:
   a body connected to the main housing via screw-threads and comprising a metal connecting block, with a hollow cylindrical configuration and a male thread on its outer edge to engage with a female thread of the main housing, and a bottom plate connected to the metal connecting block by a press fit manner;
   a spring received in a hollow portion of the metal connecting block of the body and comprising a first end resisting against the bottom plate of the body and an opposite second end resisting against a metal slider of the body; and wherein the metal slider, with a convex-shaped configuration, is received in the body to connect to the metal connecting block by wires, and resist, against the second end of the spring, and comprises two opposite third ends respectively connected to the metal connecting block in a displacement form.

12. The tube-shaped power supply device for supplying power to an atomizer as claimed in claim 3, wherein a USB charging port is arranged on the main housing and electrically connected to a charging circuit input of the PCB.

13. The tube-shaped power supply device for supplying power to an atomizer as claimed in claim 3, wherein the tube-shaped power supply device further comprises a displaying interface arranged on the main housing and configured to display working status of the tube-shaped power supply device, and a screen cover covered on the displaying interface for protecting the displaying interface; a displaying input of the displaying interface connected to a displaying output of the microprogrammed control unit.

14. The tube-shaped power supply device for supplying power to an atomizer as claimed in claim 3, wherein the base comprises:
   a body connected to the main housing via screw-threads and comprising a metal connecting block, with a hollow cylindrical configuration and a male thread on its outer edge to engage with a female thread of the main housing, and a bottom plate connected to the metal connecting block by a press fit manner;
   a spring received in a hollow portion of the metal connecting block of the body and comprising a first end resisting against the bottom plate of the body and an opposite second end resisting against a metal slider of the body; and wherein the metal slider, with a convex-shaped configuration, is received in the body to connect to the metal connecting block by wires and resist against the second end of the spring, and comprises two opposite third ends respectively connected to the metal connecting block in a displacement form.

15. The tube-shaped power supply device for supplying power to an atomizer as claimed in claim 5, wherein a USB charging port is arranged on the main housing and electrically connected to a charging circuit input of the PCB.

16. The tube-shaped power supply device for supplying power to an atomizer as claimed in claim 5, wherein the base comprises:
   a body connected to the main housing via screw-threads and comprising a metal connecting block, with a hollow cylindrical configuration and a male thread on its outer edge to engage with a female thread of the main housing, and a bottom plate connected to the metal connecting block by a press fit manner;
   a spring received in a hollow portion of the metal connecting block of the body and comprising a first end resisting against the bottom plate of the body and an opposite second end resisting against a metal slider of the body; and wherein
   the metal slider, with a convex-shaped configuration, is received in the body to connect to the metal connecting block by wires and resist against the second end of the spring, and comprises two opposite third ends respectively connected to the metal connecting block in a displacement form.

17. An electronic cigarette comprising:
   a mouthpiece;
   an atomizer connected to the bottom of the mouthpiece;
   an adjusting valve connected to the bottom of the atomizer; and
   a tube-shaped power supply device connected to the bottom of the adjusting valve for supply power to the atomizer and comprising:
   a hollow main housing with a first open portion and a second open portion opposite to the first open portion;
   a main connecting member installed on the first open portion of the main housing;
   a base installed on the second open portion of the main housing;
   an electrical core received in the main housing;
   a PCB integrated with a circuit for charging the electrical core and adjusting its output power;
   a frame received in the main housing and supporting the electrical core and the PCB;

a power output port received in the main connecting member and electrically connected to a main output of an adjustment output power of the PCB;

a receiving room faulted between the frame and an inner wall of the main housing for receiving the electrical core therein; and wherein the PCB is arranged on a side of the frame facing away from the electrical core;

a first positive electrode of the PCB is electrically connected to a second positive electrode of the electrical core, while a first negative electrode of the PCB is electrically connected to a second negative electrode of the electrical core.

18. The electronic cigarette as claimed in claim 17, wherein the PCB comprises:

a charging module configured to charge the electrical core, with a first output thereof connecting to the electrical core;

a microprogrammed control unit (MCU);

a sampling module configured to sample a voltage signal, a current signal and a status signal of the atomizer output, from the power output port and feedback the collection information to the microprogrammed control unit, with a sampling, output of the sampling module connecting to a sampling input of the microprogrammed control unit;

a booster and step-down module configured to adjust the voltage of the power output port, with a controlling portion thereof connecting to a controlling output of the microprogrammed control unit; and a human-machine interface (HMI) arranged on the main housing and configured to input adjustment instructions from user and then send a corresponding instruction to the microprogrammed control unit, with a second output of the human-machine interface connecting to the microprogrammed control unit.

19. The electronic cigarette as claimed in claim 17, wherein the base comprises:

a body connected to the main housing via screw-threads and comprising a metal connecting block, with a hollow cylindrical configuration and a male thread on its outer edge to engage with a female thread of the main housing, and a bottom plate connected to the metal connecting block by a press fit manner;

a spring received in a hollow portion of the metal connecting block of the body and comprising a first end resisting against the bottom plate of the body and an opposite second end resisting against a metal slider of the body; and wherein the metal slider, with a convex-shaped configuration, is received in the body to connect to the metal connecting block by wires and resist against the second end of the spring, and comprises two opposite third ends respectively connected to the metal connecting block in a displacement form.

20. The electronic cigarette as claimed in claim 18, wherein the tube-shaped power supply device further comprises a displaying interface arranged on the main housing and configured to display working status of the tube-shaped power supply device, and a screen cover covered on the displaying interface for protecting the displaying interface; a displaying input of the displaying interface connected to a displaying output of the microprogrammed control unit.

* * * * *